Aug. 4, 1942.   B. N. DAVIS   2,292,206
ANTITHEFT DEVICE
Filed Feb. 25, 1942   2 Sheets-Sheet 2
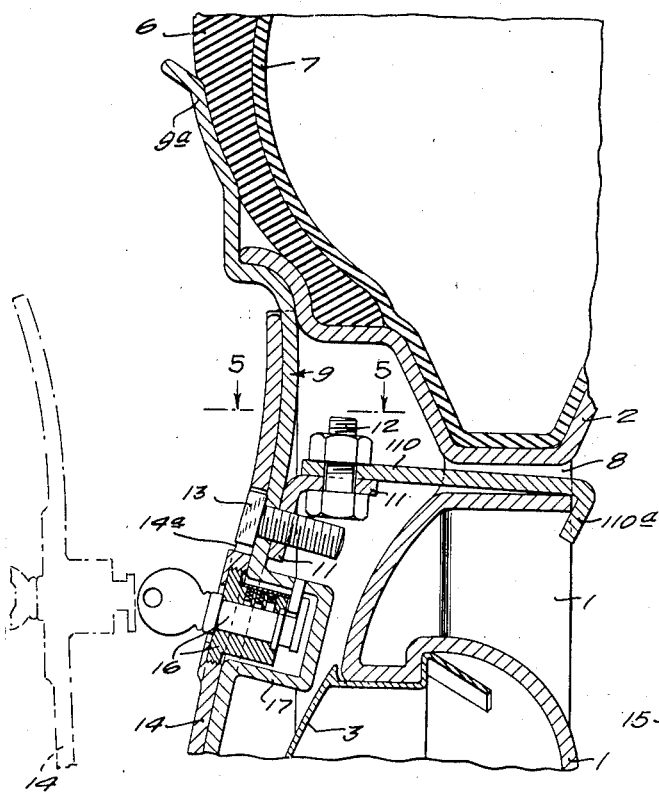
INVENTOR
BEMISS N. DAVIS
ATTORNEY Patented Aug. 4, 1942

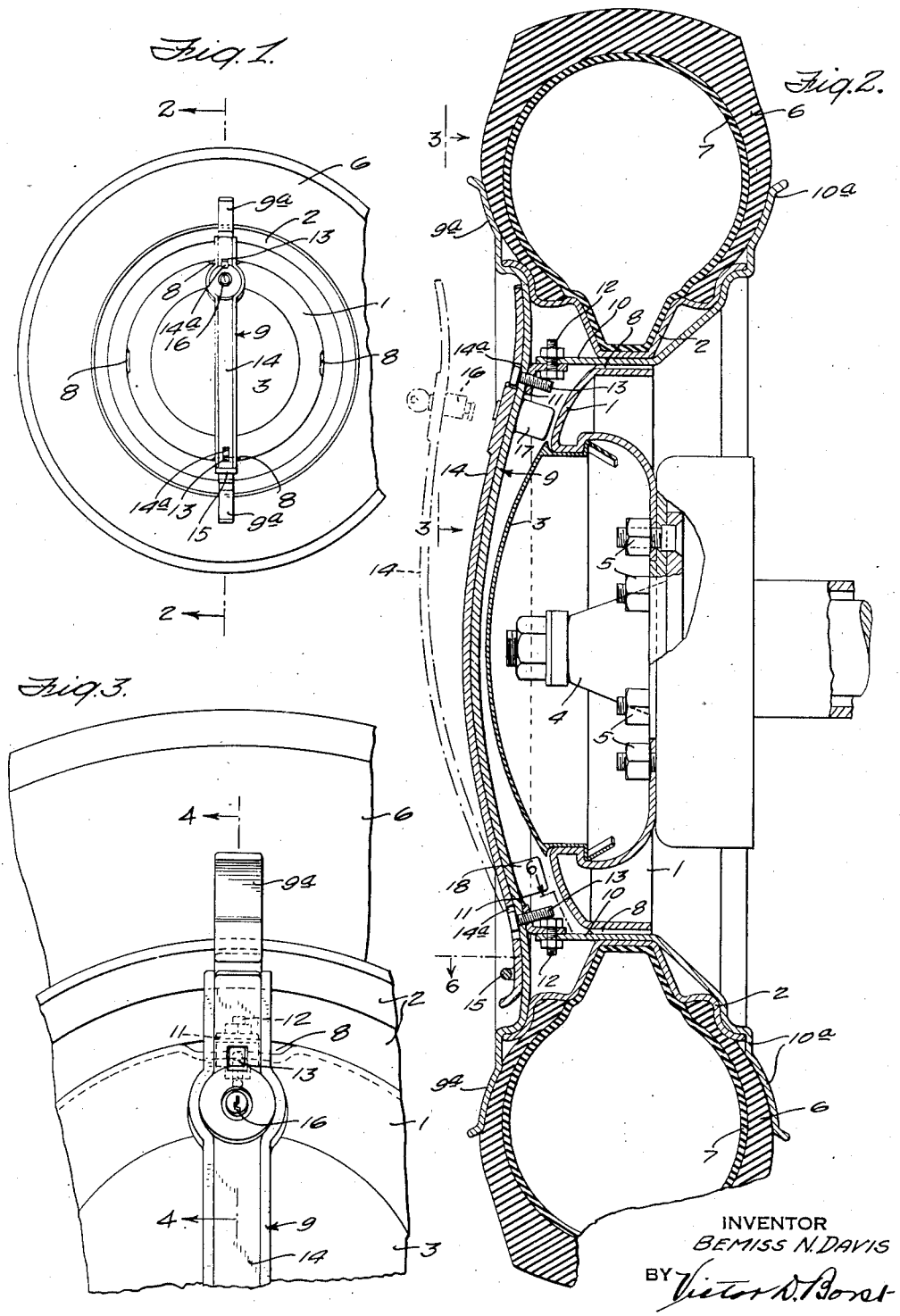

2,292,206

UNITED STATES PATENT OFFICE 2,292,206

ANTITHEFT DEVICE

Bemiss N. Davis, New Orleans, La.

Application February 25, 1942, Serial No. 432,175

12 Claims. (Cl. 70—259)

The invention is particularly designed to secure tires and wheels on automobiles against theft. Embodiments of the invention are easily applied to and removed from the wheels, and they are not unsightly and will not interfere with the rolling of the wheels.

The effective part of the device is a bar that is secured diametrally across the hub of the wheel and extends at each end beyond the rim and thus overlies the tire sufficiently to prevent it from getting by the bar even when deflated and loosened from the rim. It also prevents the removal of the hub cap which is a necessary precedent to removing the wheel.

There is generally provided a series of openings around the inner periphery of the rim of automobile wheels, and the invention contemplates utilizing these or other openings which if necessary may be made specifically for the purpose, to accommodate the retaining means which extend through them and are shaped so as to prevent forward movement, and are detachably secured at their front ends to the bar. To prevent unauthorized tampering with the securing means, a lockable instrumentality is provided which in locked condition renders the securing means immobile.

The invention also contemplates the provision of complementary means on the back of the wheel and tire to prevent removal of the tire from the rim rearwardly from where it may be slipped over the wheel. Preferably such means are afforded by shaping the retaining means so that their rear ends extend outwardly beyond the rims and in opposing relation to the inner part of the rear face of the tire.

Other details of the invention will appear from the following description of the illustrated embodiments of the invention.

Fig. 1 is a front elevation with part broken away of a tire equipped wheel with the invention applied thereto.

Fig. 2 is a median transverse section of the same on enlarged scale, on the line 2—2 of Fig. 1.

Fig. 3 is a fragmentary view in front elevation of a portion of the top of the wheel and of the anti-theft mechanism.

Fig. 4 is a transverse section on enlarged scale of the parts shown in Fig. 3 on line 4—4 thereof, showing a slightly modified form of retaining member.

Fig. 5 is a fragmentary section in plan on line 5—5 of Fig. 4.

Fig. 6 is a fragmentary section in plan on line 6—6 of Fig. 2.

Fig. 7 is a fragmentary sectional elevation of a modified embodiment of the invention.

Figs. 8 and 9 are fragmentary details in section and front elevation, respectively, of another modification of the invention.

The automobile wheel shown in Figs. 1 to 4 is of the type in which a shaped sheet metallic hub member 1 completely occupies the space inside the rim 2 and has a removable hub cap 3 which covers the inner hub 4 and the lug nuts 5 that secure the wheel to the axle. The tire consisting of the shoe 6 and the inner tube 7 is disposed on the rim 2.

The hub member 1 is shown as provided with four equally spaced openings 8 just inside the rim. The construction of various makes of car wheels differs in this respect, some having more and some fewer openings, but if the wheel to which the invention is to be applied does not have two such diametrically opposed openings two openings so located will be made.

The protecting or guard member which precludes the removal of the tire or wheel is a metallic channel bar 9 which is supported diametrally across the front of the wheel in sufficient proximity to the hub cap 3 to prevent the removal of the cap, and it is centrally disposed with respect to the axis of the wheel. As shown the bar is shaped somewhat so as to conform generally to the surface configuration, and the ends bear against and fit the rims and extend on beyond the rims and overlie the tire a sufficient distance to assure that the tire cannot pass. These ends 9a are shown as concaved and following the cross-sectional shape of the tire and preferably will be out of contact with the tire.

The channel sides terminate at about the point where the bar engages the rim, and in this construction the ends which overlie the tire are of the same width as the base of the bar, but if preferred the ends of the bar may be widened, such as the ends 9b in Figs. 8 and 9. As shown in this latter form these guard ends may be spaced slightly from the tire. Manifestly the wider the guard ends the less distance they need project beyond the tire rim to prevent removal of the tire.

The bar 9 is supported in this central position by two retaining members 10. These retaining members are metallic straps that pass through the openings 8 and are secured at their front ends to the bar 9 and are shaped to engage the rear of the wheel so as to limit their forward movement. In the form shown in Fig. 2 the rear portion of the retaining straps is bent to form guard ends 10a that bear against and conform to the rim 2 and continue on in tire opposing relation similar to the ends 9a. In this way the tire is prevented from removal in both directions.

To fasten the front ends of the retaining straps 10 to the bar 9, securing means are provided which are protected from unauthorized removal. In the form shown in Figs. 2 and 4 an angle plate 11 serves as a coupling member for each strap. The strap is attached to one leg of the plate by a bolt 12 the head of which lies within the angle of the plate, and the bar 9 is attached to the other leg of the plate by a screw 13 which is threaded through the bar and plate and extends across the head of the bolt 12 so as to interfere with and prevent the removal of the bolt. These two securing members therefore have to be inserted in one order and removed in the reverse order.

Since the screws 13 are the members that have to be taken out first in disassembling the mechanism, lockable means are provided to prevent unauthorized removal of the screws. As shown this is a plate or bar 14 which is shaped to fit upon the bar 9 and lies within the channel. The heads of the screws 13 are rectangular and rectangular holes 14a in the locking bar 14 are shaped and spaced to fit over the heads of the screws 13 when the bar 14 is in place. Thus the screws are prevented from being turned and removed.

To prevent unauthorized removal of the bar 14 to free the screws 13 means are provided to lock it to the bar 9. As shown this consists of a loop at one end and a key lock at the other. At a point beyond the opening for the screw 13 at one end the bar 9 has its flanges bridged by a strip of metal forming a loop 15, and at the other end just inside the opening for the screw 13 the bar 14 is provided with a key plug and cylinder 16 that registers with a cylindrical recess 17 on the bar 9 when the bar 14 is properly placed. The key plug has an eccentric radial projection on its inner end where it extends through the cylinder, which projection coacts with a lateral pin in the wall of the recess 17 for locking purposes.

The dotted position of the bar 14 shown in Figs. 2 and 4 will indicate the mode of applying and removing the bar. Its end opposite the lock is entered under the loop and the bar is then laid down in the channel with the key plug entering the locking recess. A turn of the key locks the bars together and in that condition the screws 13 cannot be unscrewed. A counterbalance 18 may be provided on the bar 9.

Whether or not the bar 9 is a channel member is optional, but the channel has advantage in strength, appearance and convenience in applying the locking bar and it also prevents the insertion of a prying tool between the two bars as a lock breaking instrument. The double bar construction also multiplies the strength and rigidity across the hub portion of the wheel.

In cases where provision against rearward removal of the tire is unnecessary, the retaining members may merely hook over the metal edge of the hub or over the rim. In Fig. 4 is shown such a retaining member 110 which has its rear end bent to form a hook 110a that is shown as turned down.

In case of a spoke wheel the angle plate may be dispensed with since there is ample room between the spokes to insert a retaining member that has its front end as well as its rear end bent. Such a construction is shown in Fig. 7. The retaining strap 210 has its ends reversely bent, the rear end being turned up and engaging behind the rim, and the front end being turned down and having a threaded hole to receive the screw 13. When applied to a spoke wheel the width of the retaining straps will be such as to prevent sufficient movement toward the center of the wheel to loosen the hook engagement on the inner face of the tire rim; and the same precaution will apply where the openings 8 are large or are of unusual shape.

It is obvious that the invention may be otherwise embodied and therefore it is the intention that the invention be not limited to the constructions shown in the drawings and above particularly described but only as pointed out in the following claims.

I claim:

1. Anti-theft means for automobile wheels and their tires comprising a protecting bar designed to overlie the hub and the front face of the tire, a retaining member adapted to extend through the wheel and engage the rear thereof against forward displacement, means for securing the bar to the retaining member, means for preventing access to the securing means to remove the same, and means to lock the access preventing means.

2. Anti-theft means for automobile wheels and their tires comprising a protecting bar designed to overlie the hub and the front face of the tire, a retaining member adapted to extend through the wheel and engage the rear thereof against forward displacement, an angle plate, means for securing the outer end of the retaining member to one leg of the plate, means for securing the bar to the other leg of the plate, one of the securing means being disposed in position to prevent disengagement of the other, a removable locking member for the said one securing means, and means to lock the locking member to the bar.

3. Anti-theft means for automobile wheels and their tires comprising a protecting bar designed to overlie the hub and the front face of the tire, a retaining member adapted to extend through the wheel and engage in the rear thereof against forward displacement, an angle plate for securing the retaining member to the bar, removable attaching means between the plate and the front end of the retaining member, securing means passing through the bar and plate in position to prevent removal of the attaching means, and a locking member locking the securing means in place.

4. Anti-theft means for automobile wheels and their tires comprising a protecting bar designed to overlie the hub and the front face of the tire, a retaining member adapted to extend through the wheel and engage in the rear thereof against forward displacement, an angle plate for securing the retaining member to the bar, removable attaching means between the plate and the front end of the retaining member, securing means passing through the bar and plate in position to prevent removal of the attaching means, a locking bar fitted to the outer face of the protecting bar in retaining relation to the securing means, and means for locking the two bars together.

5. Anti-theft means for automobile wheels and their tires comprising a protecting bar designed to overlie the hub and the front face of the tire, a retaining member adapted to extend through the wheel and engage in the rear thereof against forward displacement, an angle plate for securing the retaining member to the bar, removable attaching means between the plate and the front end of the retaining member, a screw fastening the bar and plate together and extending inwardly in position to prevent removal of the securing means, the screw having a non-circular head, a locking bar fitted to the outer face of the protecting bar and having a non-circular opening fitting over the screw head, and means for locking the two bars together.

6. Anti-theft means for automobile wheels and their tires comprising a protecting bar designed to overlie the hub and the front face of the tire, a retaining member adapted to extend through the wheel and engage in the rear thereof against forward displacement, an angle plate for securing the retaining member to the bar, a headed member passing through one leg of the plate and the outer end of the retaining member, a screw threaded through the bar and the other leg of the plate and extending across the head of the headed member and preventing removal of the member, the screw having a non-circular head, a locking bar fitted to the outer face of the protecting bar and having a non-circular opening fitting over the screw head, and means for locking the two bars together.

7. Anti-theft means for automobile wheels and their tires comprising a protecting bar designed to extend across the front of the wheel and overlie the inner portion of the front face of the tire in symmetrical relation to the axis of the wheel, two retaining members adapted to extend through the wheel on opposite sides of the axis and parallel thereto, releasable means for removably securing the bar to each of the retaining members, locking means for the releasable means, and means for locking the locking means to the bar.

8. Anti-theft means for automobile wheels and their tires comprising two retaining strips adapted to extend through openings in a wheel between the hub and the rim and engage in the rear of the wheel against forward displacement, a protecting bar proportioned to extend in front of the wheel beyond the rim in each direction so as to overlie the inner portion of the front face of the tire with each end, removable securing means entered from the front of the bar and attaching the bar to each retaining strip, and a locking bar removably locked to the protecting bar and preventing removal of the securing means.

9. Anti-theft means for automobile wheels and their tires comprising two retaining strips adapted to extend through openings in a wheel between the hub and the rim and engage in the rear of the wheel against forward displacement, a protecting bar proportioned to extend in front of the wheel beyond the rim in each direction so as to overlie the inner portion of the front face of the tire with each end, an angle plate for coupling each retaining strip to the bar, a bolt fastening the inner end of each strip to one leg of the plate, a screw passing through the bar and the other leg of each plate in interfering relation with the respective bolt, the screw having a non-circular head exposed on the front face of the bar, a locking bar fitted upon the protecting bar and having non-circular holes fitting over the heads of the screws, and means for locking the two bars together.

10. Anti-theft means for automobile wheels and their tires comprising two oppositely disposed retaining strips located in openings through the wheel and having their outer ends bent at an angle to overlie the rear face of the tire and engage the rim against forward displacement, a protecting bar proportioned to extend in front of the wheel beyond the rim in each direction so as to overlie the inner portion of the front face of the tire with each end, removable securing means entered from the front of the bar and attaching the bar to each retaining strip, and a locking bar removably locked to the protecting bar and preventing removal of the securing means.

11. Anti-theft means for automobile wheels and their tires comprising two oppositely disposed retaining strips located in openings through the wheel and having their outer ends bent at an angle to overlie the rear face of the tire and engage the rim against forward displacement, a protecting bar proportioned to extend in front of the wheel beyond the rim in each direction so as to overlie the inner portion of the front face of the tire with each end, an angle plate for coupling each retaining strip to the bar, a bolt fastening the inner end of each strip to one leg of the plate, a screw passing through the bar and the other leg of each plate in interfering relation with the respective bolt, the screw having a non-circular head exposed on the front face of the bar, a locking bar fitted upon the protecting bar and having non-circular holes fitting over the heads of the screws, and means for locking the two bars together.

12. Anti-theft means for automobile wheels and their tires comprising two retaining strips adapted to extend through openings in a wheel between the hub and the rim and engage in the rear of the wheel against forward displacement, a protecting bar proportioned to extend in front of the wheel beyond the rim in each direction so as to overlie the inner portion of the front face of the tire with each end, an angle plate for coupling each retaining strip to the bar, a bolt fastening the inner end of each strip to one leg of the plate, a screw passing through the bar and the other leg of each plate in interfering relation with the respective bolt, the screw having a non-circular head exposed on the front face of the bar, an integral loop on the outer face of the bar near one end, and a locking bar fitted upon the protecting bar and having one end entered in the loop and the other end detachably locked to the protecting bar, the locking bar having two non-circular holes fitting over the heads of the respective screws.

BEMISS N. DAVIS.